Jan. 21, 1941.  D. D. KNOWLES ET AL  2,229,093
COATED IGNITER
Filed Oct. 21, 1939

INVENTOR
D. D. KNOWLES
L. SUTHERLIN.
BY
ATTORNEY

Patented Jan. 21, 1941

2,229,093

UNITED STATES PATENT OFFICE 2,229,093

COATED IGNITER

Dewey D. Knowles, Verona, and Lee Sutherlin, Caldwell, N. J., assignors to Westinghouse Electric & Manufacturing Company, East Pittsburgh, Pa., a corporation of Pennsylvania Application October 21, 1939, Serial No. 300,540

6 Claims. (Cl. 250—27.5)

Our invention relates to discharge devices, and especially to a starting electrode for a mercury pool arc device.

An object of the invention is to provide a starting electrode for a mercury pool device, having a coating with a high dielectric constant.

Another object of the invention is to provide an insulation coating for an electrode having a very firm bond thereto.

A still further object of the invention is to provide a coating for an electrode that will not fail due to electrolysis.

Other objects and advantages of the invention will be apparent from the following description and drawing.

Figure 1:
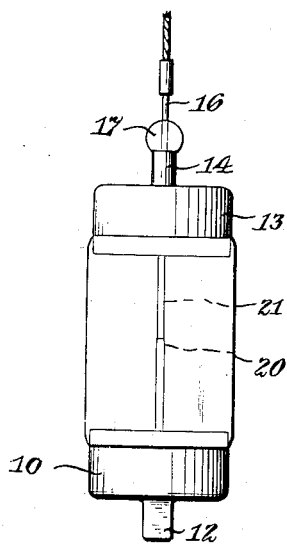
Figure 1 is a front elevational view of a preferred type of discharge device employing the invention.
Figure 2:
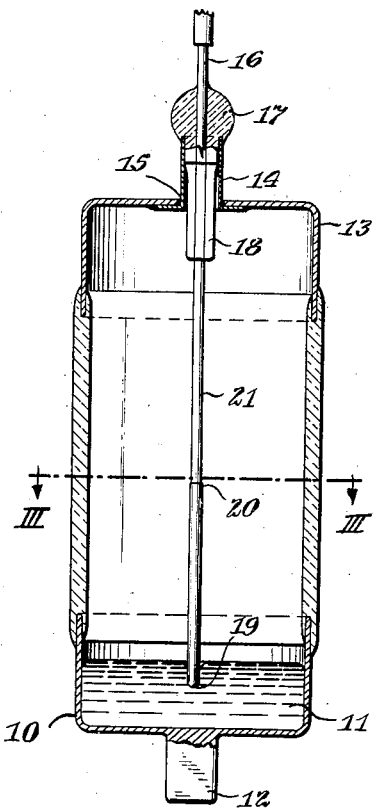
Figure 2 is an enlarged cross-sectional view of the device disclosed in Figure 1.
Figure 3:
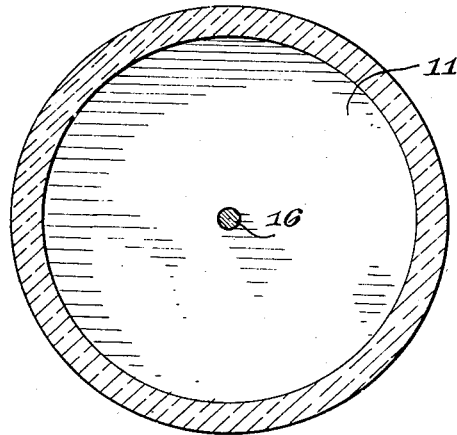
Figure 3 is a cross-section on lines III—III of Figure 2.
Figure 4:
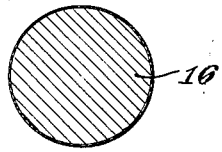
Figure 4 is a cross-section through the starting electrode.

The invention in many of its aspects is an improvement on the invention disclosed in the copending application of Joseph Slepian et al., Serial No. 280,530, filed June 22, 1939, for "Glass covered igniters." In this copending application is disclosed a glass-covered igniter for a mercury pool device. There is considerable difficulty in applying the glass to the starting electrode in a thin, uniform and bubble-free layer.

If the glass is too thin, it is apt to puncture. On the other hand, if the glass is too thick, an excessive voltage is necessary for igniting the arc. Because of the complicated nature of ordinary glasses, especially because of the presence of sodium, electrolysis often results with a consequent breakdown of the insulation.

Our invention comprises utilizing substances that are highly refractory and have a high dielectric strength and a dielectric constant many times greater than that of ordinary glass.

The invention also contemplates utilizing insulating substances that will form a very intimate bond with the electrode. This is accomplished, according to our invention, by selecting insulation metal compounds that have a lower melting point than the base metal forming the surface of the electrode. The oxides are primarily to be considered because they can be formed directly on the electrode of the base metal by means of a furnace.

The two substances that meet the requirements of this very specific form of our invention are titanium dioxide ($TiO_2$) and vanadium pentoxide ($V_2O_5$), both of which are insulators and have lower melting points than their base metals. Furthermore, these substances are pure oxides and consequently will not be subject to the danger of electrolytic failure such as may be present with glass.

Of these two, we prefer titanium dioxide because its dielectric constant is of the order of 70 in contrast to about 8 for ordinary glass, while at the same time retaining a dielectric strength equal to or better than ordinary glasses. This dielectric strength is of the order of 200 volts per mil.

In the figures in the drawing, we have disclosed a preferred embodiment in a special type of discharge device comprising a cup 10 of nickel cobalt iron alloy described in Patent No. 2,062,335 to Howard Scott issued December 1, 1936, and sold under the trade name "Kovar."

This cup 10 contains a mercury pool 11 and may also have a projection 12 for the attachment of electrical connections thereto. The anode comprises preferably a cup 13 with an eyelet 14 welded thereto. This eyelet preferably has a tubular projection extending through a central opening 15 in the cup. The edges of the two cups 11 and 13 are joined by a cylinder of borosilicate glass, preferably within the range of expansion described in the patent of Howard Scott, previously mentioned.

A conductor 16 extends through the eyelet 14, and has an elongated bead 17, also of borosilicate glass, sealed thereto, and to the inner edge of the eyelet 14. This glass surrounds the conductor for a short ways at 18 below the eyelet 14. The conductor 16 has a lower end 19 projecting below the surface of the mercury 11. The lower portion of the conductor from the end 19 up to almost the mid portion of the glass tube at 20, is covered with a layer of titanium dioxide of the order of five to ten mils in thickness.

In operation, an impulse of about 3000 to 5000 volts is applied to the conductor 16 very momentarily. This impulse has a very steep or peaked wave form. In place of this momentary impulse, a very high frequency, such as described in the copending application of Joseph Slepian et al., Serial No. 280,530, may be utilized. This momentary impulse or impulses, will ignite the discharge between the cathode and anode. We believe that the theory is that a condenser discharge is formed between the conductor 16 and the mercury across the titanium dioxide and that a spark will strike from the mercury to the surface of the titanium dioxide and this spark will rise until it reaches the exposed upper portion 21 of the electrode 16, and then be transferred to the anode 13.

The preferred method of forming the titanium dioxide starting electrode is to oxidize a titanium or titanium-coated wire and subsequently fuse the oxide layer into a smooth glass-like layer in a neutral or slightly oxidizing atmosphere. Alternately the vanadium pentoxide ($V_2O_5$) may be oxidized on vanadium although air or a very oxidizing atmosphere is utilized to obtain the pentoxide.

This invention is not limited to the compound on its base metal. Titanium dioxide may be utilized on electrodes of other materials. A coating of titanium dioxide and a binder such as nitrocellulose binder may be sprayed on to a tungsten or other suitable refractory wire, and then the binder burned out and the titanium dioxide fused into a smooth coating, as previously mentioned.

A still further method is to slip a small tube of titanium dioxide over the wire, such as tungsten, molybdenum, etc., and then fuse it into place in a slightly oxidizing flame.

The invention is not limited to utilization in the preferred embodiment illustrated. The advantages of the materials described above, are so great that the starting electrode may be utilized in tubes of unusual construction. The electrode could be immersed in a pool cathode of other metals, such as molten tin, for example.

It is apparent that many other applications may be made of the invention, in addition to the preferred embodiment disclosed.

We claim:

1. An electrode for pool cathode discharge devices, comprising a base metal and an insulating compound of said base metal integrally formed on a portion thereof, said insulating compound having a lower melting point than said base metal.

2. An electrode for pool cathode discharge devices, comprising a base metal and an insulating compound of said base metal integrally formed on a portion thereof, said insulating compound having a lower melting point than said base metal, and a dielectric constant several times that of glass.

3. An electrode for pool cathode discharge devices, comprising a conductor having a portion thereof covered with a material having a dielectric constant of the order of 70, and a dielectric strength of the order of 200 volts per mil.

4. A starting electrode for pool cathode discharge devices, comprising a conductor having an end surface of titanium dioxide.

5. A starting electrode for pool cathode discharge devices, comprising a conductor having one end covered with titanium dioxide, and a portion adjacent said titanium dioxide exposed.

6. A discharge device comprising a container having an anode, a pool cathode, and a starting electrode in contact with said pool, the contact area of said starting electrode being covered with titanium dioxide.

DEWEY D. KNOWLES.
LEE SUTHERLIN.